Patented Dec. 29, 1953

2,664,424

UNITED STATES PATENT OFFICE 2,664,424

DIOXO-PIPERIDINES

Karl Hoffmann, Binningen, and Eugen Tagmann, Basel, Switzerland, assignors to Ciba Pharmaceutical Products, Inc., Summit, N. J.

No Drawing. Application July 2, 1951, Serial No. 234,901

Claims priority, application Switzerland July 7, 1950

5 Claims. (Cl. 260—281)

The present invention relates to dioxo-piperidines.

A primary object of the invention is the embodiment of a new and useful group of dioxo-piperidines. This object is realized, according to the present invention, by the 3-aminoalkyl-2,6-dioxo-piperidines which are substituted in the 3-position by an unsaturated cyclic radical, and by the salts and quaternary compounds of these dioxo-piperidines. The unsaturated cyclic radical is preferably a monocyclic radical such as a phenyl group or a heterocyclic radical such as a pyridyl radical or a thiophene radical or a dicyclic radical such as a naphthyl group. The unsaturated cyclic radical may itself be substituted, for example by an alkyl group or by a substituted or unsubstituted hydroxyl group, or by halogen. The amino group of the aminoalkyl radical is advantageously a substituted amino group, such as an aliphatically or alicyclically substituted amino group, examples of which are a dialkylamino group such as the dimethylamino group or the diethylamino group, or an alkyleneimino group such as a piperidine group or a pyrrolidino group. Insofar as the new compounds contain a quaternated amino group, the latter advantageously includes a lower alkyl group. The alkylene chain of the aminoalkyl radical may be straight or branched, and is preferably an ethylene group, a propylene group or a butylene group. The dioxo-piperidine ring itself may also be further substituted, especially by a lower alkyl group in the 1-position.

These new compounds exhibit interesting pharmacological properities and can be used for therapeutic purposes. The 3-phenyl-3-aminoalkyl-2,6-dioxo-piperidines are especially interesting and, in particular, 3-phenyl-3-(β-diethylaminoethyl)-2,6-dioxo-piperidine of the formula

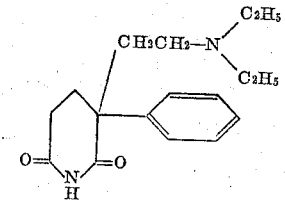

and its salts possess outstanding parasympathicolytic activity.

The aforesaid dioxo-piperidines are obtained when 2-aminoalkyl-pentane-1,5-diacids or their functional derivatives, which compounds are substituted in 2-position by an unsaturated cyclic radical, or quaternary compounds corresponding thereto, are converted into their cyclic imides. According to the invention, this can be achieved when the pentane-1,5-diacids or functional derivatives thereof, such as their halides, are reacted with ammonia or amines. Moreover, the aforesaid new compounds can also be prepared by intramolecularly acylating the pentane-1,5-diacid-monoamides or their functional derivatives. In this operation the pentane-1,5-diacid-monoamides and their functional derivatives may also be formed in the course of the reaction. Thus for example correspondingly substituted pentane-1,5-diacid-mononitriles, dinitriles or nitrile esters may be treated, in the presence or absence of solvents, with condensing agents such as concentrated sulphuric acid, acetic anhydride, tin tetrachloride, titanium tetrachloride, boron trifluoride etherates, zinc chloride, aluminum chloride or mixtures thereof. The pentane-1,5-diacid-diamides or diammonium salts may also be converted into the cyclic imides by heating.

Depending upon the method of preparation, the new aminoalkyl-dioxo-piperidines are obtained in the form of their bases, salts or quaternary compounds. From the bases salts can be formed, such as the hydrogen halides, sulphate, nitrate, phosphate, acetate, propionate, oxalate, malate, citrate, methane sulphonate, ethane sulphonate, hydroxyethane sulphonate, benzoate, salicylate, p-aminosalicylate, or toluene sulphonate. The quaternary compounds are produced advantageously by quaternation of the tertiary amines, for example by reaction thereof with reactive esters of alcohols, especially those of the hydrohalic acids, sulphuric acid and organic sulphonic acids, such as alkyl halides, dialkyl sulphates and aliphatic or aromatic sulphonic acid esters.

The following examples illustrate the invention, the relation between parts by weight and parts by volume being the same as that between the kilogram and the litre. Temperatures are expressed in degrees centigrade.

Example 1

350 parts by weight of the potassium salt of 2 - phenyl - 2 - (β - diethylaminoethyl) - pentane - 1,5 - diacid - mononitrile - (1) are dissolved with heating in 700 parts by volume of glacial acetic acid, 850 parts by volume of acetic anhydride are added, and then 250 parts by volume of concentrated sulphuric acid introduced portionwise. The temperature of the reaction mixture in this operation rises to 120–130°. When the reaction subsides, the whole is finally maintained for a further 15 minutes on the boiling water bath. The solvent is removed on the water bath under reduced pressure, the residue poured onto ice and caustic soda solution, and the whole extracted with chloroform and the chloroform solution washed with water, dried over potassium carbonate and the solvent evaporated. The crystalline residue, consisting of 3 - phenyl - 3 - (β - diethylaminoethyl) - 2,6 - dioxo - piperidine of the formula

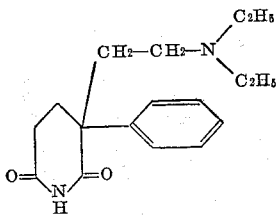

after recrystallization from a mixture of ethyl acetate and ligroin, melts at 118–120°.

The hydrochloride, produced by dissolving the base in ethyl acetate and adding an equivalent quantity of hydrochloric acid gas dissolved in ethyl acetate, melts, after recrystallization from a mixture of methyl alcohol and ethyl acetate, at 168–172°.

The iodo-methylate can be produced by heating the base for ½ hour with the equivalent quantity of methyl iodide, in ethyl acetate as solvent, in a closed vessel to 60–70°. When recrystallized from a mixture of methyl alcohol and ethyl acetate, it melts at 200–202°.

The above base is also produced by boiling 195 parts by weight of 2-phenyl-2-(β-diethylaminoethyl) - pentane - 1,5 - diacid - mononitrile - (1) in 250 parts by volume of acetic anhydride for one hour under reflux. After evaporation of the excess of acetic anhydride, the working up takes place in the same manner as above described.

The same compound is obtained when, for example, 20 parts by weight of 2-phenyl-2-(β-diethylaminoethyl) - pentane - 1,5 - diacid - mononitrile - (1), dissolved in 100 parts by volume of acetic anhydride and 100 parts by volume of glacial acetic acid, are treated in portions with 10 parts by volume of tin tetrachloride and the reaction mixture subsequently maintained for a further 10 minutes on the boiling water bath.

The 2-phenyl-2-(β-diethylaminoethyl)-pentane-1,5-diacid-mononitrile-(1) employed as starting material in this example can for example be produced as follows:

192 parts by weight of phenyl-(β-diethylaminoethyl)-acetic acid nitrile are dissolved in 500 parts by volume of dioxane, treated with 15 parts by volume of a 40 per cent. tertiary butanol solution of trimethyl-benzyl-ammonium hydroxide and thereupon, at a reaction temperature of 60–70°, 95 parts by weight of methyl acrylate added in portions. When reaction subsides, the whole is finally maintained for 30 minutes at 70°, allowed to cool, diluted with water and extracted with ether. The ethereal solution is washed with water, dried over solid potassium carbonate, the ether evaporated and the residue distilled in high vacuum. The resultant methyl ester of 2 - phenyl - 2 - (β - diethylaminoethyl) - pentane - 1,5 - diacid - mononitrile - (1) distils as a light oil at 152° under a pressure of 0.2 mm. For hydrolysis, for example 350 parts by weight of the ester are boiled under reflux in a solution of 82 parts by weight of solid caustic potash in 1000 parts by volume of methyl alcohol for 4 hours.

The same carboxylic acid can also be obtained by hydrolysis of 2-phenyl-2-(β-diethylaminoethyl) - pentane - 1,5 - diacid - dinitrile by 10 hours boiling under reflux with the aid of acetic anhydride and concentrated hydrochloric acid. This dinitrile can be produced from phenyl-(β-diethylaminoethyl)-acetic acid-nitrile by condensation with acrylic acid nitrile; it is a viscous oil which boils at 164° under 0.4 mm. pressure.

Example 2

To 130 parts by weight of the potassium salt of 2 - phenyl - 2 - (β - dimethylaminoethyl) - pentane - 1,5 - diacid - mononitrile - (1), dissolved in 100 parts by volume of glacial acetic acid and 200 parts by volume of acetic anhydride, are added in portions 100 parts by volume of concentrated sulphuric acid. After the strongly exothermic reaction has subsided, the reaction mixture is maintained for a further 15 minutes on the boiling water bath and then the excess of solvent mixture is distilled off under reduced pressure and further working up carried out in the same manner as described in Example 1. The resultant 3-phenyl-3-(β-dimethylaminoethyl)-2,6-dioxopiperidine of the formula

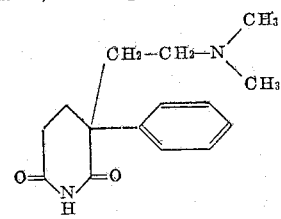

after recrystallization from a mixture of ethyl acetate and ligroin, melts at 138–140°.

The hydrochloride, produced in an analogous manner to that described in Example 1, after recrystallization from a mixture of methyl alcohol and ethyl acetate, melts at 220–225°.

The potassium salt of the 2-phenyl-2-(β-dimethylaminoethyl) - pentane - 1,5 - diacid - mononitrile - (1) employed as starting material in this example can be produced in a manner analogous to that described in Example 1, by hydrolysis of the methyl ester of 2-phenyl-2-(β - dimethylamino - ethyl) - pentane - 1,5 - diacid - mononitrile - (1). The preparation of this ester can take place by condensation of methyl acrylate with phenyl-(β-dimethylaminoethyl)-acetic acid nitrile; it boils at 147–148° under a pressure of 0.45 mm.

Example 3

To 140 parts by weight of dry 2-phenyl-2(γ-piperidino-propyl) - pentane-1,5 - diacid - mononitrile-(1), dissolved in a mixture of 200 parts by volume of acetic anhydride and 100 parts by volume of glacial acetic acid, are slowly added in portions 100 parts by volume of concentrated sulphuric acid. Finally the reaction mass is maintained for 20 minutes at 95–100° and then worked up as in the preceding examples. There is thus obtained the 3-phenyl-3-(γ-piperidino-propyl)-2,6-dioxo-piperidine of the formula

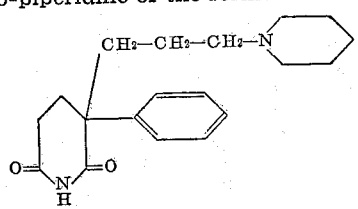

It is a highly viscous, distillable oil which boils at 198–204° under 0.2 mm. pressure. The hydrochloride, produced as described in Example 1 and recrystallized from a mixture of methyl alcohol and ethyl acetate, melts at 110–113°.

The 2-phenyl-2-(γ-piperidino-propyl)-pentane-1,5-diacid-mononitrile-(1) is obtained for example by alkaline hydrolysis of 2-phenyl-2-(γ-piperidino-propyl)-pentane-1,5-diacid-methyl-ester-mononitrile-(1). This ester is a viscous oil which boils at 181-182° under 0.5 mm. pressure and can be produced by condensation of phenyl-(γ-piperidino-propyl)-acetic acid nitrile with methyl acrylate.

*Example 4*

To 156 parts by weight of the potassium salt of 2-(p-chlorophenyl)-2-(β-dimethylaminoethyl)-pentane-1,5-diacid mononitrile-(1), dissolved in 100 parts by volume of acetic anhydride, 100 parts by volume of concentrated sulphuric acid are added in portions in such a manner that the reaction temperature does not exceed 125-130°. Thereupon the whole is maintained for a further 15 minutes at 130°. By working up as described in the foregoing examples, there is obtained the 3-(p-chlorophenyl)-3-(β-dimethylaminoethyl)-2,6-dioxo-piperidine of the formula

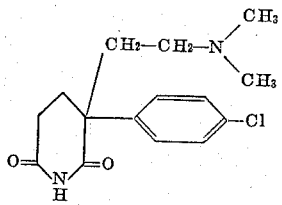

which can be recrystallized from a mixture of ethyl acetate and ligroin. It melts at 153-155°.

The 2-(p-chlorophenyl)-2-(β-dimethylaminoethyl)-pentane-1,5-diacid-mononitrile-(1) may be produced by hydrolysis of the methyl ester of 2-(p-chlorophenyl)-2-(β-dimethylaminoethyl)-pentane-1,5-diacid-mononitrile-(1), which is obtained from (p-chlorophenyl)-(β-dimethylaminoethyl)-acetic-acid-nitrile by condensation with methyl acrylate. The above ester is a light-colored oil which boils at 164-168° under 0.5 mm. pressure.

*Example 5*

95 parts by weight of the hydrochloride of 2-phenyl-2-(β-methyl-β-dimethylamino-ethyl)-pentane-1,5-diacid-1-mononitrile are dissolved in 500 parts by volume of acetic anhydride with the application of heat and the solution refluxed for 5 hours. The excess acetic anhydride is distilled off under reduced pressure and the residue again dissolved in 200 parts by volume of glacial acetic acid. 25 parts by volume of concentrated sulphuric acid are added and the whole is heated on the boiling water bath for a short while, then poured onto ice, and the pH is adjusted to 7-8 with caustic soda solution. There follow: Extraction with ethyl acetate, washing of the extract with dilute sodium carbonate solution and water, drying over potash, evaporation of the solvent and recrystallization from a mixture of ethyl acetate and ligroin. The resultant 3-phenyl-3-(β-methyl-β-dimethylamino-ethyl)-2,6-dioxo-piperidine of the formula

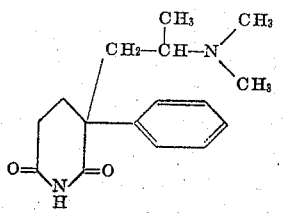

melts at 170°-172°.

The hydrochloride, prepared in the usual manner and recrystallized from a mixture of acetone and ethyl acetate, melts at 245°-249°.

The 2-phenyl-2-(β-methyl-β-dimethylamino-ethyl)-pentane-1,5-diacid-1-mononitrile used as starting material in this example can be prepared by hydrolyzing 2-phenyl-2-(β-methyl-β-dimethylamino-ethyl)-pentane-1,5-diacid-dinitrile. This dinitrile is obtainable by condensing acrylic acid nitrile with phenyl-(β-methyl-β-dimethylamino-ethyl)-acetic acid nitrile; it boils at 160-162° under 0.3 mm. pressure.

Derivatives of the named compounds substituted in the 1-position by an alkyl radical for example by the methyl radical are obtained by reacting the corresponding pentane-1,5-diacid-anhydrides with primary amines such as methyl amine.

*Example 6*

40 parts by weight of the dry potassium salt of 2-(m-methoxy-phenyl)-2-(β-diethylamino-ethyl)-pentane-1,5-diacid-mononitrile-(1) are suspended in 50 parts by volume of glacial acetic acid and 100 parts by volume of concentrated sulphuric acid added in portions. The reaction mixture is maintained at a temperature of 100-110° for a short while and then poured onto ice and caustic soda solution, the whole is extracted with chloroform, the chloroform extract washed with water, dried over potassium carbonate, and the solvent distilled off. The crystalline residue consists of 3-(m-methoxy-phenyl)-3-(β-diethylamino-ethyl)-2,6-dioxo-piperidine of the formula

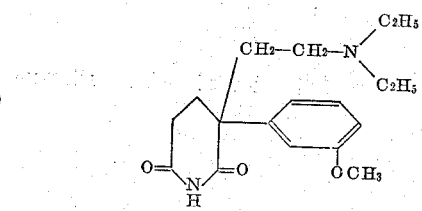

and after recrystallization from a mixture of glacial acetic acid and ligroin melts at 118-120°.

The hydrochloride, prepared in the usual manner, after recrystallization from methyl alcohol with an addition of ethyl acetate, melts at 188-190°.

The potassium salt of 2-(m-methoxy-phenyl)-2-(β-diethylamino-ethyl)-pentane-1,5-diacid-mononitrile-(1) used in this example as starting material can be prepared e. g. in the following manner:

By condensation of m-methoxy-benzylcyanide with β-chlorethyl-diethylamine in the presence of sodamide there is obtained m-methoxy-phenyl-(β-diethylamino-ethyl)-acetic acid nitrile of boiling point 144-152° (under 0.9 mm. pressure) which, by condensation with acrylic acid methyl ester in the presence of a basic catalyst, can be converted into the methyl ester of 2-(m-methoxy-phenyl)-2-(β-diethylamino-ethyl)-pentane-1,5-diacid-mononitrile-(1) boiling at 168-175° (under 0.7 mm. pressure). The latter can be hydrolysed with methyl alcoholic solution of caustic potash into the corresponding potassium salt of 2-(m-methoxy-phenyl)-2-(β-diethylamino-ethyl)-pentane-1,5-diacid-mononitrile-(1).

*Example 7*

100 parts by weight of the dry potassium salt of 2-(m-methoxy-phenyl)-2-(β-dimethylamino - ethyl) - pentane - 1,5 - diacid-mononitrile-(1) are introduced in portions while cooling with ice into 150 parts by volume of concentrated sulphuric acid. Heat is evolved while a clear solution forms. The solution is then heated for half an hour on a boiling water bath. After cooling the product is worked up in the manner indicated in Example 6. On recrystallization from ethyl acetate with an addition of ligroin there is obtained the 3 - (m - methoxyphenyl) - 3 - (β - dimethylamino-ethyl) - 2,6-dioxo-piperidine of the formula

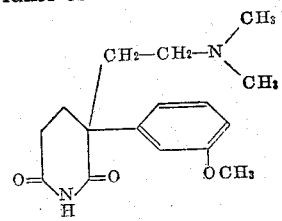

and of melting point 158–160°.

The hydrochloride, prepared in the usual manner, after recrystallization from a mixture of methyl alcohol and ethyl acetate, melts at 212–214°.

The patassium salt of 2 - (m - methoxyphenyl) - 2 - (β - dimethylamino - ethyl) - pentane - 1,5 - diacid - mononitrile - (1) used as starting material in this example can be prepared in a manner analogous to that described in Example 6 in that m-methoxy-benzylcyanide is reacted instead of with β-chlorethyl-diethyl-amine with an equivalent quantity of β-chlor-ethyl-dimethylamine. There is thus obtained m-methoxy - phenyl - (β - dimethylamino - ethyl) - acetic acid nitrile of boiling point 136–137° (under 0.2 mm. pressure) which can be converted into the methyl ester of 2-(m-methoxyphenyl) - 2 - (β - dimethylamino - ethyl) - pentane - 1,5 - diacid - mononitrile - (1), boiling at 165–168° (under 0.7 mm. pressure), by condensation with acrylic acid methyl ester in the presence of e. g. trimethyl-benzyl-ammonium hydroxide. Hydrolysis, for example with methanolic potassium hydroxide leads to the corresponding potassium salt of 2 - (m - methoxyphenyl) - 2 - (β - dimethylamino - ethyl) - pentane-1,5-diacid-mononitrile-(1).

*Example 8*

50 parts by volume of concentrated sulphuric acid are added in portions to 35 parts by weight of 2 - phenyl - 2 - (γ - diethylamino - propyl) - pentane-1,5-diacid-dinitrile, dissolved in 30 parts by volume of glacial acetic acid. The temperature of the reaction mixture rises to 120°. When the exothermic reaction has subsided the whole is maintained for a short while longer at 110–120°. By the method of working up of Example 6, there is obtained the 3 - phenyl - 3 - (γ - diethyl-amino-propyl) -2,6-dioxo-piperidine of the formula

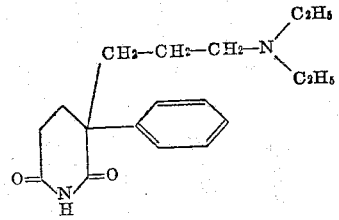

in the form of a highly viscous oil of boiling point 198–205° under 0.2 mm. pressure). Its hydrochloride, prepared in the usual manner, after recrystallization from acetone with the addition of ethyl acetate, melts at 187–190°.

The 2 - phenyl - 2 - (γ - diethylamino - propyl)-pentane-1,5-diacid-dinitrile used as starting material in this example can be prepared, for example, in the following manner: By condensation of benzyl cyanide with γ-chloro-propyl-diethylamine in the presence of sodamide there is obtained the phenyl-(γ-diethylamino-propyl)-acetic acid nitrile of boiling point 121–125° (under 0.15 mm. pressure) which can be converted into the 2 - phenyl - 2 - (γ - diethylamino-propyl)-pentane-1,5-diacid-dinitrile boiling at 158–164° (under 0.3 mm. pressure) by reaction with acrylic acid nitrile in the presence of a basic catalyst.

*Example 9*

To 33 parts by weight of 2-phenyl-2-[β-(N-methyl - N - cycloheptyl - amino) - ethyl] - pentane-1,5-diacid-dinitrile, dissolved in 40 parts by volume of glacial acetic acid there are added in portions 50 parts by volume of concentrated sulphuric acid in such manner that the temperature of the reaction mixture does not exceed 120°. When the exothermic reaction has subsided the whole is maintained at 110–120° for a short while. By the method of working up described in the foregoing examples there is obtained the 3-phenyl - 3 - [β - (N - methyl - N - cycloheptyl-amino)-ethyl]-2,6-dioxo-piperidine of the formula

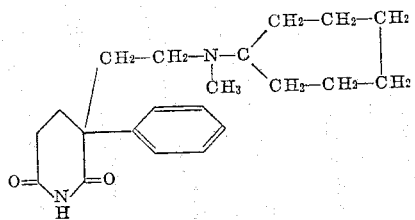

which, when recrystallized from chloroform with an addition of methyl alcohol, melts at 92–95°. The hydrochloride, prepared in the usual manner, when recrystallized from a mixture of methyl alcohol and isopropyl ether, melts at 231–234°.

The same compound can also be obtained when 2 - phenyl - 2 - [β - (N - methyl - N - cycloheptyl - amino) - ethyl] - pentane - 1,5 - diacid-dinitrile is hydrolyzed by boiling with concentrated hydrochloric acid in glacial acetic acid as solvent into the 2-phenyl-2-[β-(N-methyl-N-cycloheptyl - amino) - ethyl] - pentane - 1,5-diacid-mononitrile-(1) and refluxing the latter with acetic anhydride.

The 2 - phenyl - 2 - [β - (N - methyl - N-cycloheptyl - amino) - ethyl] - pentane - 1,5-diacid-dinitrile used as starting material in this example can be prepared for instance as follows: Benzyl cyanide can be condensed with N-β-chlorethyl-N-methyl-N-cycloheptyl-amine in the presence of sodamide into the phenyl-β-(N-methyl-N-cycloheptyl-amino)-ethyl-acetic acid nitrile of boiling point 147–151° (under 0.3 mm. pressure), which can be reacted with acrylic acid nitrile in the usual manner to obtain the 2-phenyl - 2 - [β -(N - methyl - N - cycloheptyl-amino) - ethyl]-pentane - 1,5-diacid-dinitrile of boiling point 187–192° (under 0.15 mm. pressure).

*Example 10*

55 parts by weight of 2-(2-thienyl)-2-(β-diethyl - amino - ethyl) - pentane - 1,5 - diacid-dinitrile are refluxed for 12 hours with 200 parts by volume of glacial acetic acid and 75 parts by volume of concentrated hydrochloric acid, the reaction mixture is evaporated to dryness under reduced pressure, the residue dissolved in 250 parts by volume of acetic anhydride and again refluxed for 12 hours. The reaction mixture is then evaporated to dryness, the residue dissolved in water, rendered alkaline while cooling with ice, the whole exhaustively extracted with chloroform, the chloroform solution dried over potassium carbonate, the solvent distilled off, and the residue distilled in a high vacuum. The resultant 3-thienyl - (2) - 3 - (β - diethylamino - ethyl) - 2,6-dioxo-piperidine of the formula

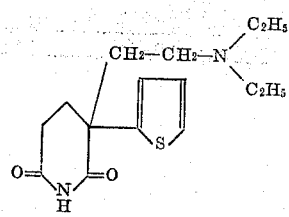

distills at 182–190° under 0.1 mm. pressure, crystallizes on standing, and after recrystallization from acetone with an addition of isopropyl ether melts at 116–123°. The hydrochloride, prepared in the usual manner, when recrystallized from a mixture of acetone and isopropyl ether, melts at 149–151°.

The 2 - thienyl - (2) - 2 - (β - diethylamino-ethyl) -pentane-1,5-diacid-dinitrile used as starting material in this example can be prepared, e. g. as follows: Thienyl-(2)-acetonitrile is condensed with β-chlorethyl-diethylamine in the presence of sodamide to obtain the thienyl-(2)- (β - diethylamino - ethyl) - acetic acid - nitrile of boiling point 95–106° (under 0.3 mm. pressure). The latter can be converted in conventional manner into the 2-thienyl-(2)-2-(β-diethylamino-ethyl) -pentane-1,5-diacid-dinitrile of boiling point 160–163° (under 0.3 mm. pressure) by reaction with acrylic acid nitrile.

*Example 11*

16 parts by weight of the anhydride of the hydrochloride of 2-phenyl-2-(β-diethylamino-ethyl) -pentane-1,5-diacid are heated to 120–130° for 6 hours with 50 parts by volume of absolute toluene and 15 parts by volume of methylamine in a closed vessel. By the usual methods of working up as described in the foregoing examples, there is obtained the 1-methyl-3-phenyl-3 - (β - diethylamino - ethyl) - 2,6 - dioxo-piperidine of the formula

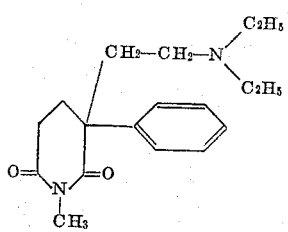

in the form of a highly viscous oil of boiling point 215–220° (under 0.1 mm. pressure), which can be converted in conventional manner into its readily water soluble hydrochloride.

The hydrochloride of the anhydride of 2-phenyl-2-(β-diethylamino-ethyl) -pentane - 1,5-diacid used as starting material in this example can be prepared for example as follows: Phenyl-(β-diethylamino-ethyl) -acetonitrile can be hydrolyzed by means of concentrated sulphuric acid into the corresponding amide (melting point 70–72°) and the latter can be converted into the methyl ester of phenyl-(β-diethylamino-ethyl) -acetic acid, boiling at 102–107° (under 0.5 mm. pressure) by refluxing with methyl alcohol while simultaneously passing dry hydrogen chloride through the reaction mixture. Condensation of this product with acrylic nitrile in the presence of a basic catalyst, as for example trimethyl-benzyl-ammonium hydroxide, leads to the 2-phenyl-2-(β-diethylamino - ethyl) - pentane-1,5-diacid-monomethyl ester - (1) - mononitrile-(5) which boils at 158–165° (under 0.35 mm. pressure). This product can be hydrolyzed by refluxing with concentrated hydrochloric acid in the presence of glacial acetic acid as solvent into the hydrochloride of the 2-phenyl-2-(β-diethylamino-ethyl) - pentane - 1,5 - diacid; from the latter the anhydride of the hydrochloride of the 2-phenyl-2-(β-diethylamino-ethyl) - pentane-1,5-diacid can be obtained by refluxing with acetyl chloride.

*Example 12*

6.75 parts by weight of 2-pyridyl-(3')-2-(β-dimethylaminoethyl) -pentane - 1,5 - diacid - dinitrile are boiled under reflux for 6 hours with 25 parts by volume of glacial acetic acid and 25 parts by volume of concentrated hydrochloric acid. Excess hydrochloric acid and glacial acetic acid are evaporated under reduced pressure and the residue refluxed for 3 hours with 50 parts by volume of acetic anhydride. After evaporation of the excess acetic anhydride and working up in analogy to the preceding examples there is obtained the 3-pyridyl-(3')-3-(β-dimethylamino-ethyl) -2,6-dioxo-piperidine of the formula

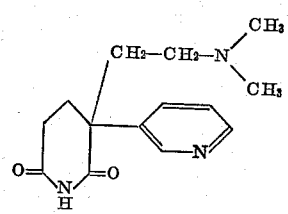

in the form of a viscous oil of boiling point 185–204° (under 0.2 mm. pressure) which can be converted in the usual manner into the readily water soluble hydrochloride.

The 2-pyridyl - (3') - 2 - (β - dimethylamino-ethyl) -pentane-1,5-diacid-dinitrile used as starting material in this example can be prepared e. g. in the following way: Pyridyl-(3)-acetonitrile can be converted into the pyridyl-(3)-(β-dimethylamino-ethyl) -acetic acid nitrile of boiling point 107–113° (under 0.3 mm. pressure) by means of β-chlorethyl-diethylamine in the presence of sodamide as condensing agent and e. g. benzene as solvent, using a reaction temperature of 60–70°. From the nitrile thus obtained there can be obtained the 2-pyridyl-(3')-2-(β-dimethylamino-ethyl) -pentane-1,5 - diacid - dinitrile boiling at 170–182° (under 0.2 mm. pressure) by condensation with acrylic nitrile in the presence of e. g. trimethyl-benzyl-ammonium hydroxide as catalyst and dioxane as solvent.

Having thus disclosed the invention, what is claimed is:

1. A compound selected from the group consisting of the 3-amino-alkyl-2,6-dioxo-piperidines, which are substituted in 3-position by an unsaturated monocyclic radical and in which the alkylene group of the aminoalkyl radical contains not more than six carbon atoms, the acid salts of the said dioxo-piperidines with therapeutically useful acids, and the quaternary ammonium compounds of the said dioxo-piperidines in which the amino group of the aminoalkyl in 3-position is quaternated.

2. A 3-phenyl-3-aminoalkyl-2,6-dioxo-piperidine, in which the phenyl radical is unsubstituted and in which the alkylene group of the aminoalkyl radical contains not more than six carbon atoms.

3. An acid salt of a 3-phenyl-3-aminoalkyl-2,6-dioxo-piperidine with a therapeutically useful acid, the 3-phenyl radical being unsubstituted, and the alkylene group of the 3-aminoalkyl radical containing not more than six carbon atoms.

4. 3-phenyl-3-($\beta$-diethylaminoethyl)-2,6-dioxo-piperidine.

5. 3-phenyl-3-($\beta$-diethylaminoethyl)-2,6-dioxo-piperidine hydrochloride.

KARL HOFFMANN.
EUGEN TAGMANN.

References Cited in the file of this patent

UNITED STATES PATENTS

| Number | Name | Date |
|---|---|---|
| 2,055,583 | Neber | Sept. 29, 1936 |
| 2,151,047 | Preiswerk | Mar. 21, 1939 |